United States Patent Office 3,552,834
Patented Jan. 5, 1971

3,552,834
OPTICAL INSTRUMENT FOR MEASURING OR CONTROLLING ANGULAR POSITIONS
Georg Vogl, Saltsjobaden, and Bo Hogstrom, Danderyd, Sweden, assignors, by mesne assignments, to Jungner Instrument Aktiebolag, Stockholm, Sweden
Filed May 8, 1967, Ser. No. 636,977
Claims priority, application Sweden, May 10, 1966, 6,394/66
Int. Cl. G02f 1/34
U.S. Cl. 350—285    2 Claims

ABSTRACT OF THE DISCLOSURE

The optical instrument of the present invention is utilized for measuring or setting angular positions. The optical system is disposed inside a tube which is rotatably mounted in a stationary casing in such a manner that the optical radiation passes through the tube. The rotor of a synchro is supported on the tube and the stator of the synchro is supported on the casing. The rotor can be provided with slip rings to supply electrical current to the rotor winding, or the tube can be manufactured from a magnetic material part of which is formed as a rotor. A multi-pole synchro can be combined with a single-pole synchro in order to provide a coarse-fine signal.

---

The present invention relates to an optical instrument for measuring or controlling angular positions by means of an optical system disposed inside a tube which is rotatable with respect to a casing.

In prior art instruments of the kind above defined, particularly in instruments for remote control or remote reading of angular positions, the rotatable optical system is generally via a gear connected to a sensitizing member, e.g., a synchro or a resolver. However, such a design has the principal disadvantages that the accuracy of the gear wheels and of the mounting of the tube must be extremely high and that it is relatively voluminous.

According to this invention the tube, through which the optical radiation passes, does at the same time serve as the shaft of the synchro. In that way the errors resulting from mechanical allowances are entirely eliminated and, at the same time, the accuracy of the synchro can be increased since the space available for the synchro is greater. Instead of bearings for the synchro and for the rotatable optical system—involving errors and frictional losses—there is only need for one bearing supporting the combined optical and electrical unit. Especially when an angular position is to be remote-controlled by means of a servo system the instrument according to the invention affords great advantages because of freedom of play between the sensitizing member, the synchro, and the controlled member, the rotatable optical system.

Two embodiments of the invention will now be described in greater detail, reference being made to the accompanying drawing.

Figure 1:
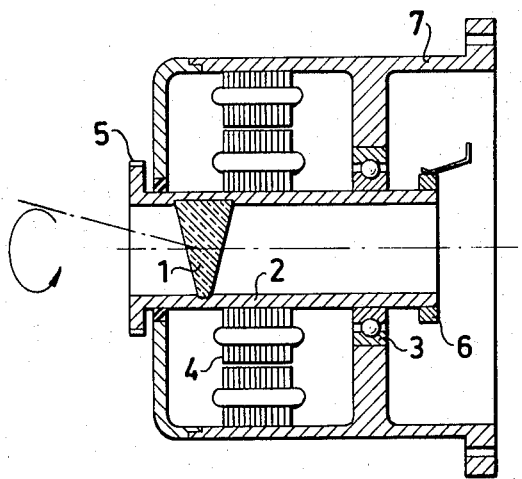
FIG. 1 is a sectional view through an instrument according to the first embodiment of the invention.

The instrument shown in FIG. 1 comprises an optical wedge 1 which is to be rotated through a certain angle. It is secured inside a tube 2 which is journalled in the instrument casing 7 by means of a ball bearing 3. The tube carries a rotor 4 of a synchro as well as slip rings 6 and a gear ring 5 for driving the rotatable system e.g. a servo motor. Upon rotation of the wedge inside tube 2 the line of collimation describes a conical surface.

By connecting two similar wedges in cascade and controlling them symmetrically it is possible to obtain angular deviations within a maximum value, corresponding to the sum of the wedge angles, and a minimum, equaling zero. It is well-known to arrange two optical elements in cascade as just described, and instruments employing such an arrangement are generally called optical micrometers. However, when the present invention is applied in such an instrument, the accuracy and versatility thereof is considerably increased.

Figure 2:
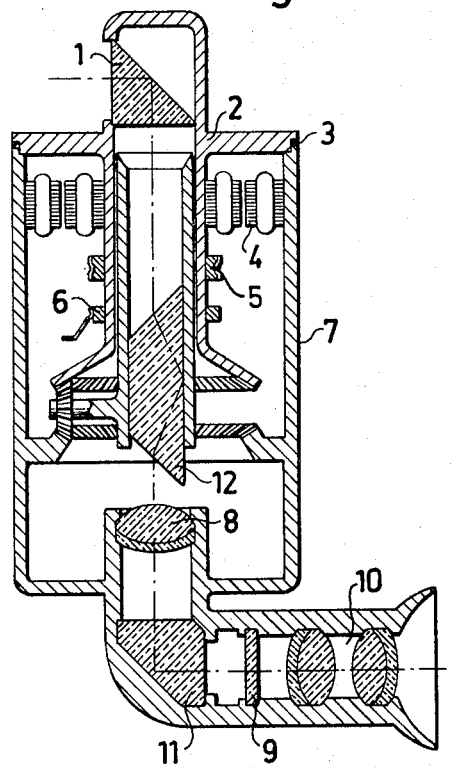
FIG. 2 is a sectional view through an instrument according to the second embodiment of the invention.

FIG. 2 relates to a goniometer. The optical wedge or prism 1, determines the location of the line of collimation and is disposed inside tube 2 which is mounted in a bearing 3. The tube 2 carries a rotor, surrounded by a stator 4, slip rings 6 and a worm gear ring 5. The stator of the synchro is enclosed by a casing 7 also containing ordinary telescopic elements such as an objective 8, a recticle 9, an ocular 10, and a prism 11. The reversion prism 12 is driven at a speed corresponding to half the rotational speed of prism 1 for compensation of the rolling of the picture. That compensation method is also previously known and does not constitute any part of this invention.

Quite naturally, instruments of the kind here at issue may also be provided with scales, indexes and manual control means.

According to the embodiments hereinabove described the rotor has windings which call for slip rings to supply electrical current to those windings. It is, however, also within the concept of this invention to utilize rotors without any windings in which case the energization and sensitizing windings are both mounted in the stator. In such a case it could be advantageous to manufacture the tube from a magnetic material and utilize a portion thereof as rotor.

In order to further increase the resolution and accuracy of the system, it is possible to use a multi-pole synchro which provides a fine signal. This multi-pole synchro is preferably combined with a single-pole synchro which provides a coarse signal, thereby forming a so-called two-speed synchro.

What we claim is:

1. An optical instrument for measuring or setting angular deviations between a rotatable and a stationary system,
   (a) said rotatable system comprising a tube,
   (b) an optical system disposed within said tube,
   (c) a casing,
   (d) said tube being rotatably mounted within said casing,
   (e) a rotor carried by said tube and a stator being supported by said casing and surrounding said rotor,
   (f) one of said rotor and stator supplying an electrical output measuring signal which varies as a function of angular position of said rotor with respect to said stator,
      said rotor also rotating in response to an electrical input setting signal supplied to one of said rotor and stator which varies as a function of desired angular position of said rotor with respect to said stator,
      said instrument thereby forming an electromechanical analog converter.

2. The device of claim 1 which is of the multi-pole type.

References Cited

UNITED STATES PATENTS 2,850,939  9/1958  Steel _____ 350—321
2,858,453  10/1958  Harris _____ 350—7

(Other references on following page)

References Cited

| | | | |
|---|---|---|---|
| 3,011,124 | 11/1961 | Hermann et al. | 350—285 |
| 3,072,794 | 1/1963 | Ostergren | 250—203 |
| 3,311,747 | 3/1967 | Smith, Jr. et al. | 250—203 |
| 3,350,033 | 10/1967 | Goldberg | 250—236 |
| 2,454,959 | 11/1948 | Barnes | 356—24 |
| 3,061,730 | 10/1962 | Jankowitz | 250—203 |

OTHER REFERENCES

Johnson, T. C., "Selsyn Design and Application," Electrical Engineering Transactions, October 1945, vol. 64, pp. 703–708.

RONALD L. WIBERT, Primary Examiner

J. ROTHENBERG, Assistant Examiner

U.S. Cl. X.R.

318—24; 340—198